United States Patent
Lee et al.

(10) Patent No.: US 12,380,540 B2
(45) Date of Patent: Aug. 5, 2025

(54) FAST DIFFUSION-BASED IMAGE RESTORATION WORKFLOW VIA SHARING OF INITIAL DIFFUSION STEPS

(71) Applicant: CANON MEDICAL SYSTEMS CORPORATION, Tochigi (JP)

(72) Inventors: Tzu-Cheng Lee, Vernon Hills, IL (US); Xi Chen, Vernon Hills, IL (US); Liang Cai, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 43 days.

(21) Appl. No.: 18/403,170

(22) Filed: Jan. 3, 2024

(65) Prior Publication Data

US 2025/0217940 A1    Jul. 3, 2025

(51) Int. Cl.
*G06T 5/70* (2024.01)
(52) U.S. Cl.
CPC .................... *G06T 5/70* (2024.01)
(58) Field of Classification Search
CPC ...................................................... G06T 5/70
See application file for complete search history.

(56) References Cited

U.S. PATENT DOCUMENTS

| | | | |
|---|---|---|---|
| 11,069,033 B2 * | 7/2021 | Fang | G06F 17/15 |
| 2022/0198612 A1 * | 6/2022 | Weinmann | G06T 5/50 |
| 2023/0177652 A1 * | 6/2023 | Duan | H04N 19/42 |
| | | | 382/156 |

OTHER PUBLICATIONS

Dana J. Lin, et al., "Artificial Intelligence for MR Image Reconstruction: An Overview for Clinicians", Journal of Magnetic Resonance Imaging, vol. 53, No. 4, Apr. 2021, pp. 1015-1028.

Luella Marcos, et al., "Low Dose CT Image Denoising Using Boosting Attention Fusion GAN with Perceptual Loss", 43rd Annual International Conference of the IEEE Engineering in Medicine & Biology Society (EMBC), Nov. 1-5, 2021, pp. 3407-3410 (Abstract only).

Chitwan Saharia, et al., "Image Super-Resolution via Iterative Refinement" IEEE Transactions on Pattern Analysis and Machine Intelligence, vol. 45, No. 4, Apr. 2023, pp. 4713-4726.

Jonathan Ho, et al., "Denoising Diffusion Probabilistic Models" Advances in Neural Information Processing Systems (NeurIPS 2020), vol. 33, 2020, pp. 6840-6851.

(Continued)

*Primary Examiner* — Yassin Alata
(74) *Attorney, Agent, or Firm* — Oblon, McClelland, Maier & Neustadt, L.L.P.

(57) ABSTRACT

A method of denoising a plurality of input images, including grouping the plurality of input images into a plurality of groups; determining, for each group of the plurality of groups, an initial representative image for the group; performing, for each group, a sequence of T1 denoising sampling steps using a diffusion-based probabilistic model, starting with the initial representative image for the group, to generate a corresponding sequence of representative images for the group, wherein T1 is an integer greater than or equal to 1; and for each input image in each group, performing a second sequence of T2 denoising sampling steps using the model to generate a final image that is a restored image corresponding to the input image, wherein T2 is an integer greater than or equal to 1, and T=T1+T2.

20 Claims, 7 Drawing Sheets

(56) References Cited

OTHER PUBLICATIONS

Gustav Müller-Franzes, et al., "Diffusion Probabilistic Models Beat GAN on Medical 2D Images", Electrical Engineering and Systems Science > Image and Video Processing, arXiv preprint, arXiv:2212.07501v1, Dec. 14, 2022, pp. 1-13.
Jiaming Song, et al., "Denoising Diffusion Implicit Models", Computer Science > Machine Learning, arXiv preprint arXiv:2010.02502v2, Oct. 5, 2022, pp. 1-22.
Alex Nichol, et al., "Improved Denoising Diffusion Probabilistic Models", Proceedings of the 38th International Conference on Machine Learning, PMLR, vol. 139, 2021, pp. 8162-8171.
Zhaoyang Lyu, et al., "Accelerating Diffusion Models via Early Stop of the Diffusion Process", Computer Science > Computer Vision and Pattern Recognition, arXiv preprint, arXiv:2205.12524v2, May 30, 2022, pp. 1-17.
Wenjun Xia, et al., "Low-Dose CT Using Denoising Diffusion Probabilistic Model for 20x Speedup", Electrical Engineering and Systems Science > Image and Video Processing, arXiv preprint, arXiv:2209.15136v1, Sep. 29, 2022, pp. 1-10.
Xutao Guo, et al., "Accelerating Diffusion Models via Pre-Segmentation Diffusion Sampling for Medical Image Segmentation", IEEE 20th International Symposium on Biomedical Imaging (ISBI), arXiv:2210.17408v1, Oct. 27, 2022, 5 pages.
Chentao Cao, et al., "High-Frequency Space Diffusion Model for Accelerated MRI", IEEE Transactions on Medical Imaging, arXiv:2208.05481v4, Dec. 14, 2022, pp. 1-10.

* cited by examiner for $G_0, G_1, \ldots, G_M$ do

$\bar{x}_T \sim N(0, I), \bar{x}_t = mean(Z_n \in G_m)$ for $T, T-1, T-2 \ldots t > 1$ do

$k \sim N(0, I)$ $\bar{x}_{t-1} = \frac{1}{\sqrt{\alpha_t}} \left( \bar{x}_t - \frac{1-\alpha_t}{\sqrt{1-\bar{\alpha}_t}} \epsilon_\theta(\bar{x}_t, Y, t) \right) + \sigma_t k$ return $\bar{x}_t \approx x_t$ for $Z_n \in G_m$ do for $t, t-1, t-2, \ldots, 1$ do

$if\ t = 1, k = 0$ $x_{t-1} = \frac{1}{\sqrt{\alpha_t}} \left( x_t - \frac{1-\alpha_t}{\sqrt{1-\bar{\alpha}_t}} \epsilon_\theta(x_t, Y, t) \right) + \sigma_t k$ return $x_0$ return $x_0$ *for every* $Z_n \in G_m$ return $x_0$ *for every* $Z$

FIG. 4

FAST DIFFUSION-BASED IMAGE RESTORATION WORKFLOW VIA SHARING OF INITIAL DIFFUSION STEPS

BACKGROUND

Field

The present disclosure relates to restoration of a series of images.

Description of the Related Art

Deep learning-based models for image restoration typically use a series of steps to modify an input image to a desired degree. When a sequence of images is acquired, a deep learning model can process the sequence by repeating the series of steps for each image in the series. The number of steps used to process the sequence can affect the processing time and capacity required by the deep learning model.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, the present disclosure is related to a method of denoising a plurality of input images, the method comprising obtaining a diffusion-based probabilistic model that was trained, using at least one target image and at least one conditional image, to perform denoising over T steps, wherein T is an integer greater than or equal to two; grouping a plurality of input images into a plurality of groups; determining, for each group of the plurality of groups, an initial representative image for the group; performing, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

In one embodiment, the present disclosure is related to a non-transitory computer-readable storage medium for storing computer readable instructions that, when executed by a computer, cause the computer to perform a method, the method comprising obtaining a diffusion-based probabilistic model that was trained, using at least one target image and at least one conditional image, to perform denoising over T steps, wherein T is an integer greater than or equal to two; grouping the plurality of input images into a plurality of groups; determining, for each group of the plurality of groups, an initial representative image for the group; performing, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

In one embodiment, the present disclosure is related to an apparatus, comprising processing circuitry configured to obtain a diffusion-based probabilistic model that was trained, using at least one target image and at least one conditional image, to perform denoising over T steps, wherein T is an integer greater than or equal to two; group a plurality of input images into a plurality of groups; determine, for each group of the plurality of groups, an initial representative image for the group; perform, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: perform, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an illustration of a sample process for implementing a bulk diffusion method according to one embodiment of the present disclosure;

DETAILED DESCRIPTION

Figure 1:
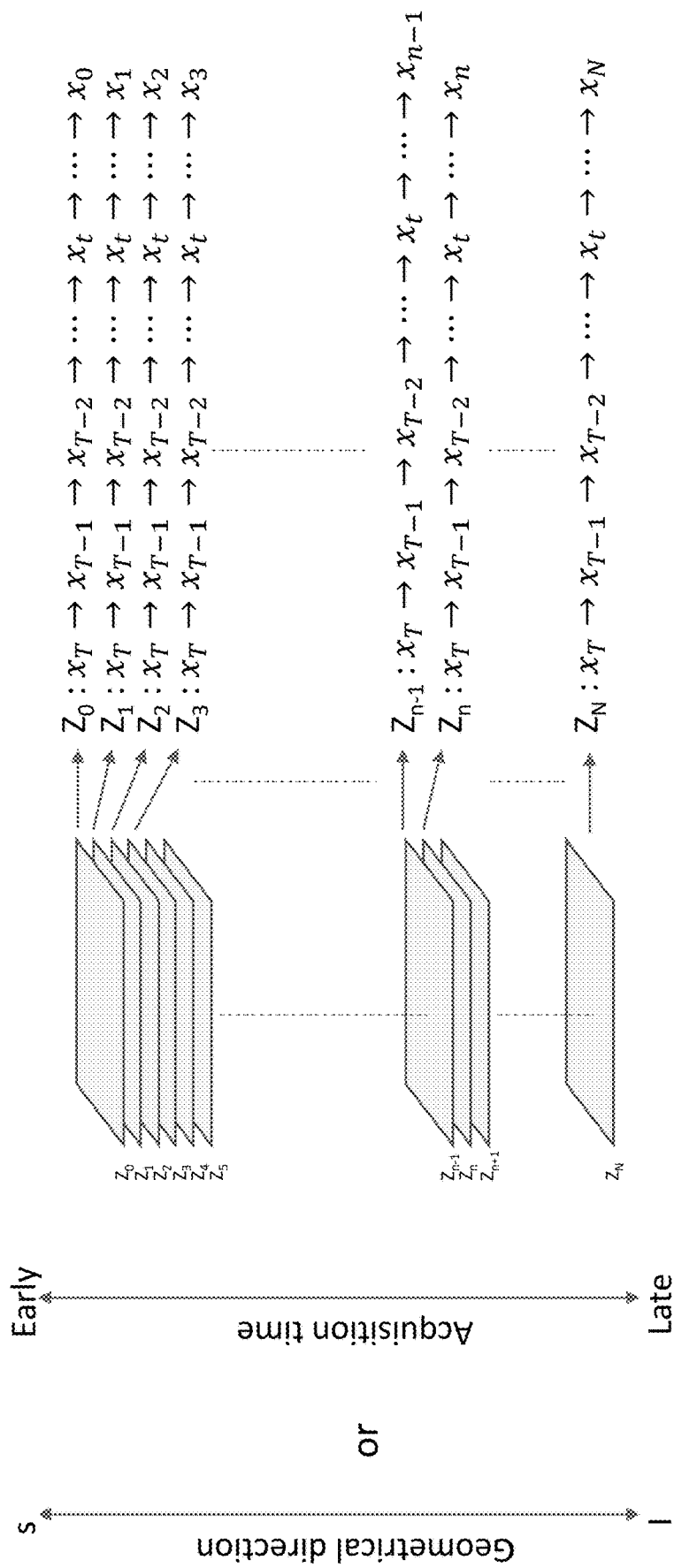
FIG. 1 is a schematic of a diffusion-based image restoration workflow according to one embodiment of the present disclosure.

Referring now to the drawings, wherein like reference numerals designate identical or corresponding parts throughout the several views.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

In one embodiment, the present disclosure is directed to systems and methods for image restoration using deep learning-based models. Image restoration techniques can include, but are not limited to, denoising, deblurring, resolution enhancement (e.g., super-resolution imaging), and image/signal reconstruction (e.g., compressed sensing). Each of these techniques can be used independently or in combination to improve the visibility of features in an image. Image restoration has important applications for medical imaging modalities such as computed topography (CT) scanning, magnetic resonance imaging (MRI), etc., which are often subject to noise due to physical interactions within the imaging systems. It can be appreciated that the systems and methods described herein are not limited to medical imaging applications and can be used for various imaging types and techniques. In particular, the methods of the present disclosure can be useful for processing any volumes of image data (e.g., a series of images or image slices) that are acquired over a spatial or temporal span.

Generative deep learning-based models can be used to degrade noise and similar artifacts in an acquired image in order to generate a restored image that is of higher quality than the acquired image. In one embodiment, a generative model can be used to denoise an image by converting a first data distribution (noisy image data) to a second data distribution (restored image data). In one embodiment, the generative model can be a denoising diffusion probabilistic model (DDPM). It can be appreciated that DDPMs are described herein as an illustrative example of a class of generative models, and that other types of probabilistic models and especially diffusion-based probabilistic models for image restoration are also compatible with the methods of the present disclosure.

A DDPM can be used to denoise an image in a series of diffusion steps. The DDPM can be trained to denoise an image in an iterative process, wherein the DDPM generates an increasingly denoised image at each diffusion step. The DDPM can be trained to denoise an image by converting a first probability distribution corresponding to an input image (e.g., a noisy image) to a second probability distribution corresponding to an output image (e.g., a denoised image). In one example, the first probability distribution can be a normal distribution corresponding to normal (Gaussian) noise that is present in an acquired image. The DDPM can be trained to remove the noise by converting the normal probability distribution to a predicted distribution corresponding to a denoised, restored image.

In one embodiment, a DDPM can be trained using a set or sequence of training images. The set of training images can include a target image, which is a clean or denoised image, and noisy images that are generated from the target image. In one embodiment, the noisy training images can be generated by applying modeled noise (e.g., Gaussian noise) to the target image in one or more steps. The set of training images can include images with increasing amounts of noise. The set of training images can further include a pure noise image generated from the target image. In one embodiment, the modeled noise can be similar to or based on an expected type of noise in an acquired image that the DDPM will be used to restore. In one embodiment, the target image can be similar to or based on a type of image that the DDPM will be used to recover. The training images can each be input to the DDPM. The DDPM can be trained to denoise an input training image to output a restored image at each step in a series of diffusion steps. The series of diffusion steps can correspond to the one or more steps used to apply noise to the target image. In this manner, the DDPM can be trained to "reverse" a stepwise process for applying noise to an image in order to remove said noise from the image.

At each diffusion step, the DDPM can be trained to minimize a loss function, the loss function corresponding to a difference in noise between a predicted output image and a training image for the given diffusion step. The DDPM can therefore be trained to accurately predict and model a difference in noise between each input image and an output image at each diffusion step. In one embodiment, the training of the DDPM can include setting one or more weights of the model. The one or more weights of the model can vary for each diffusion step within the series of diffusion steps or for at least one of the diffusion steps within the series. In one embodiment, a conditional image can be input to the DDPM during the training process to guide the generation of output images. In one embodiment, the conditional image can be the target image. The target image used for training the DDPM can be at least one target image and can include more than one target image. For example, the at least one target image can include a low-resolution medical image (e.g., CT image) and an edge-detected medical image (e.g., CT image) or otherwise processed medical image. Similarly, the conditional image used for training the DDPM can be at least one conditional image and can include more than one conditional image. In one example, the at least one conditional image can include a low-resolution medical image (e.g., CT image) and an edge-detected medical image (e.g., CT image), or otherwise processed medical image. In one example, the at least one conditional image or the at least one target image can include three consecutive conditional images for a multi-dimensional (e.g., 2.5 dimensional) process.

In one embodiment, the input to a trained DDPM can be a noisy image, a conditional image, and a diffusion step (also referred to as a time step or sampling step). The DDPM can predict the second probability distribution corresponding to a restored image given the conditional image as a known condition. In one embodiment, the DDPM can denoise a pure noise image in a series of diffusion steps in order to generate a final restored image. The pure noise image can be the first image input to the DDPM. The DDPM can output a denoised image (also referred to herein as a restored image) for each diffusion step. The denoised image output from each diffusion step in the series can be input to a following diffusion step in order to iteratively denoise the pure noise image. The DDPM can include one or more learned weights used to output the restored image, wherein the value of the one or more learned weights can be dependent on the diffusion step. Additional details regarding the training and use of a DDPM for can be found in Ho, J. et. al, (2020). "Denoising diffusion probabilistic models." Advances in neural information processing systems, 33, 6840-6851 and in Xia, W. et. al, (2022). "Low-Dose CT Using Denoising Diffusion Probabilistic Model for 20× times Speedup." arXiv preprint arXiv:2209.15136, each of which is incorporated herein by reference in its entirety for all purposes.

In one embodiment, the DDPM can be used to denoise a series of images. The series of images can be acquired in sequence over time or over a spatial dimension. For example, a series of images can be acquired over time via a renal scan in order to evaluate kidney function. In the denoising process (also referred to as an inference process or sampling process), the DDPM can denoise and identify larger or more generalized features in initial denoising (diffusion) steps. These larger features are typically consistent throughout a series of images. For example, the general shape and location of the kidney and structures therein can first be identified in a scan image and are not likely to change within a single renal scan. The DDPM can then denoise and identify smaller features or details in later diffusion steps. In the example of a renal scan, the DDPM can identify finer details of the shape and size of renal structures, as well as the location of any contrast dye within the kidney. These details can change throughout the series of images as the renal system processes fluid in the body. Changes throughout the series of images are likely to be gradual and continuous over time. Therefore, adjacent images in a series of images can be similar to each other.

In another example, a series of images can be acquired through a scan of one or more sections of the body along one or more directions. In a similar manner, the DDPM can first denoise and identify larger features such as the general shape of the section of the body and organs therein. The DDPM can then denoise and identify smaller features and/or finer details of the organs. Adjacent images within the series depict portions of the body that are also in close proximity with each other. Therefore, the adjacent images in the series are also likely to be similar to each other and share large features as the scan progresses along the body.

FIG. 1 is a schematic of a process for denoising a series of N images $(Z_0, Z_1, Z_2, Z_3, Z_4, Z_5, \ldots Z_N)$ using a trained DDPM. The series of N images can be collected over a period of time or along a spatial direction. For each image in the series of images, a pure noise image $x_T$ can be input to the DDPM. The pure noise image $x_T$ can be generated using a probability distribution model, such as a Gaussian distribution. A conditional image can also be input to the DDPM for the denoising process. In one embodiment, the conditional image can be the image (one of the series $Z_0, Z_1, Z_2, Z_3, Z_4, Z_5, \ldots Z_N$) that is being denoised. The conditional image can include more than one conditional images, such as an edge-detected image or otherwise processed image.

The DDPM can be used to denoise each image $(Z_0, Z_1, Z_2, Z_3, Z_4, Z_5, \ldots Z_N)$ in a series of T diffusion steps. The DDPM can denoise the pure noise image $x_T$ in a series of T diffusion steps to generate a sequence of restored images $x_{T-1}, x_{T-2}$, etc. for each image in the series. At each diffusion step, the restored image from the previous diffusion step can be input to the DDPM along with the conditional image and the timestep (T-1, T-2, etc.). For example, the DDPM can denoise the pure noise image $x_T$ based on the conditional image $Z_0$ to generate the restored image $x_{T-1}$ at time step T-1. The DDPM can then denoise the image $x_{T-1}$ based on the conditional image $Z_0$ to generate a further restored image $x_{T-2}$ at time step T-2. At time step T, the DDPM can output an image $x_0$ that is a denoised version of the conditional image $Z_0$. After T time steps for each image $(Z_0, Z_1, Z_2, Z_3, Z_4, Z_5, \ldots Z_N)$, the DDPM can output a corresponding denoised image $(x_0, x_1, x_2, x_3, x_4, x_5, \ldots x_N)$. In this manner, the DDPM performs N*T diffusion steps to denoise every image in the series of images.

In one embodiment, the present disclosure is directed towards bulk diffusion methods of image denoising that take advantage of similarities between adjacent images in a series of images to achieve faster denoising of the series of images using a diffusion-based probability model. The methods described herein can reduce the number of diffusion steps needed to denoise a series of images while retaining inference accuracy. Reducing the number of diffusion steps can result in faster denoising as well as reduced computational power usage.

In one embodiment, the method can include grouping images in a series of images and performing initial batch denoising on groups of images using a trained DDPM. A group of images can be a subset of adjacent images within a series of images that are collected over a period of time or over a spatial direction. The series of images can be divided into one or more groups, wherein each group can include one or more images. Each of the one or more groups of images can have the same or a different number of images. For example, a first group of images $G_0$ can include the first n images in a series, a second group of images $G_1$ can include the subsequent n+1 to n+m images in a series, etc. The number of images in a group can be referred to herein as a thickness of the group. In one embodiment, the thickness of a group can be modulated based on a type of image acquisition or an object that is being imaged in the series of images. For example, the number of images in a group can be set such that one or more features or a type of feature (e.g., features of a certain size) are constant in each image of the group.

In one embodiment, the method can include determining a representative image of a group of n images. In one example, the representative image can be generated by computing an average value for each pixel across the n images. In one embodiment, the representative image can be an image of the group of images (e.g., a first image, an nth image, an n/2th image). In one embodiment, the representative image can be a preprocessed image, such as an image that has been processed in the frequency domain and weighted. The representative image can be generated via any combination of image computation and processing and is not limited to the examples provided herein. The representative image can be input as a conditional image to the DDPM at each diffusion step in a series of initial diffusion steps. The number of initial diffusion steps can be represented by the quantity T1. The DDPM can denoise a pure noise image over T1 initial diffusion steps using the representative image as a conditional image. The features identified by the DDPM in the initial T1 diffusion steps are likely to be consistent throughout each image in the group of images. Therefore, denoising that is conditioned on the representative image rather than on each image in the group is sufficient for the initial diffusion steps for any of the images in the group. The number of initial diffusion steps for which the representative image is used as a conditional image can be modulated based on the total number of diffusion steps (T), the type of scan, expected features in the series of images, etc. For example, the number of initial diffusion steps can be set such that the DDPM can identify features that are present in each image in the group of images within the initial diffusion steps.

The DDPM can output a representative restored image after the final (T1) step of the series of initial diffusion steps. The representative restored image can be generated by the DDPM from a pure noise image using the representative image of the group of images as a conditional image. In one embodiment, the representative restored image can include one or more features that are shared across each image in the group of images. After the T1 initial diffusion steps, the appearance of each image in the group of images may diverge. For example, the appearance of finer details or smaller features can differ for each image in the group of images. These features may not be distinguishable by the DDPM until the completion of the T1 initial diffusion steps. The T1 initial diffusion steps can result in a representative restored image wherein the larger and less-detailed features that the images in the series have in common are denoised and visible. Therefore, the T1 initial diffusion steps can be shared among each image in the group of images and does not need to be repeated by the DDPM for each image.

In one embodiment, the representative restored image generated from the T1 initial diffusion steps can be used as an input image for further diffusion steps conditioned on each image in the group of images. The DDPM can denoise the representative restored image using each image of the group of n images as a conditional image to generate a restored image for each image in the group of n images. The denoising of the representative restored image conditioned on each image can be performed over T2 diffusion steps. The DDPM can then output n final images corresponding to the n images in the group. In this manner, the DDPM can reduce the number of diffusion steps needed to denoise each image in the group by performing a single series of T1 initial diffusion steps using the representative image as a conditional image to generate a restored representative image. The DDPM can then denoise the restored representative image in n series of T2 diffusion steps to generate the n output images. This method eliminates the need to repeat the T1 initial diffusion steps for each of the n images in the group of images. The remaining T2 diffusion steps can be used to identify and denoise features that are unique to each image in the group of images or that are distinct in an image.

Figure 2:
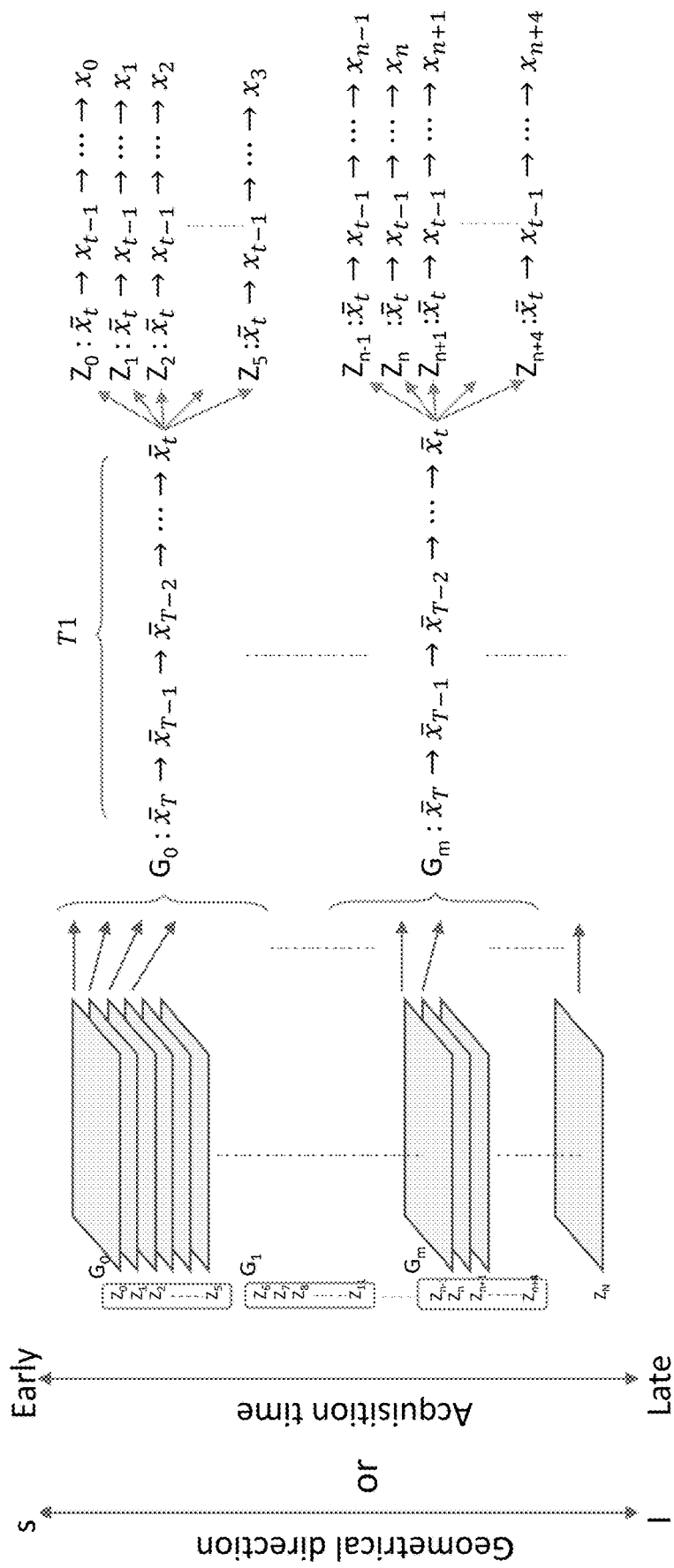
FIG. 2 is a schematic of a bulk diffusion-based image restoration workflow according to one embodiment of the present disclosure.

FIG. 2 is a schematic of the bulk diffusion method according to one embodiment of the present disclosure. A trained DDPM can be used to denoise a series of N images ($Z_0, Z_1, Z_2, Z_3, Z_4, Z_5, \ldots Z_N$). The series of N images can be collected over a period of time or along a spatial direction. In one embodiment, the series of N images can be grouped into one or more groups ($G_0, G_1, \ldots G_M$), wherein each group includes a subset of the N images. For example, the group $G_0$ can include images $Z_0$ through $Z_5$, the group $G_1$ can include images $Z_6$ through $Z_{11}$, etc., as illustrated in FIG. 2. Turning to the group $G_0$ as an illustrative example, a representative image $\bar{Z}$ can be input as a conditional image to the DDPM. The representative image $\bar{Z}$ can be, for example, an average of the images $Z_0$ through $Z_5$. A pure noise image $\bar{x}_T$ can be input to the DDPM. The DDPM can be trained to denoise an image in a series of T diffusion steps. The DDPM can denoise the pure noise image $\bar{x}_T$ based on the conditional image $\bar{Z}$ in a series of T1 initial diffusion steps to generate a sequence of restored representative images $\bar{x}_{T-1}, \bar{x}_{T-2}$, etc., wherein T1<T. At each diffusion step, the restored representative image from the previous diffusion step can be input to the DDPM along with the conditional image $\bar{Z}$ and the timestep (T-1, T-2, etc.). For example, the DDPM can denoise the pure noise image $\bar{x}_T$ based on the conditional image $\bar{Z}$ to generate the restored representative image $\bar{x}_{T-1}$ at time step T-1. The DDPM can then denoise the image $\bar{x}_{T-1}$ based on the conditional image $\bar{Z}$ to generate a further restored (denoised) representative image $\bar{x}_{T-2}$ at time step T-2.

After T1 diffusion steps, the DDPM can output a representative restored image $\bar{x}_t$ that has been generated using the representative image $\bar{Z}$ as a conditional image. The representative restored image $\bar{x}_t$ can be a last image of the sequence of representative images generated by the DDPM in the T1 diffusion steps. As illustrated in FIG. 2, the DDPM can then be used to denoise the representative restored image $\bar{x}_t$ using each of the images of the group $G_0$ as a conditional image. For example, the DDPM can denoise the representative restored image $\bar{x}_t$ using the image $Z_0$ as a conditional image in a series of subsequent diffusion steps to output a restored image $x_0$ corresponding to the original image $Z_0$; the DDPM can denoise the representative restored image $\bar{x}_t$ using the image $Z_1$ as a conditional image in a series of subsequent diffusion steps to output a restored image $x_1$ corresponding to the original image $Z_1$; the DDPM can denoise the representative restored image $\bar{x}_t$ using the image $Z_2$ as a conditional image in a series of subsequent diffusion steps to output a restored image $x_2$ corresponding to the original image $Z_2$, etc. In one embodiment, the DDPM can denoise the representative restored image $\bar{x}_t$ in t subsequent diffusion steps, wherein t+T1=T total diffusion steps, as illustrated in FIG. 2. The t subsequent diffusion steps can be referred to herein with the quantity T2. In this manner, the DDPM can denoise each image in a group of N images using T1+(T2*N) diffusion steps, wherein T1+T2=T. This method reduces the number of diffusion steps needed in comparison with the method illustrated in FIG. 1, which uses N*T steps to diffuse a series of N images.

The process of generating a representative restored image for a group of images and denoising the representative restored image conditioned on each image in the group of images can be repeated for each group in the series of images. Each group can contain the same or a different number of images. The number of initial diffusion steps T1 and the number of subsequent diffusion steps T2 can vary for each group or can be the same for each group. In one embodiment, the number of initial diffusion steps T1 can be referred to as a length of the initial diffusion process using the representative images. The length of the initial diffusion process can be modulated based on the expected content of the images in the group. For example, the length of the initial diffusion process can be modulated based on an expected size of one or more features. In one embodiment, the length of the initial diffusion process and/or the number of total diffusion steps (T) can be dependent on the training of the DDPM.

In one embodiment, an image can be downsampled prior to a diffusion step. For example, the representative image of a group of images can be downsampled prior to initial diffusion steps so that the downsampled representative image is smaller in size than the original images of the group. Downsampling the representative image can reduce the processing time or capacity needed to denoise the representative image in the initial diffusion steps. The representative image can be downsampled without affecting the appearance of features that are identified (denoised) in the initial diffusion steps. In one embodiment, the final representative restored image $\bar{x}_t$ that is generated after T1 initial diffusion steps can be upsampled prior to the remaining T2 diffusion steps that are conditioned on the individual images in the group. The upsampling can resize the representative restored image $\bar{x}_t$ so that the image $\bar{x}_t$ is the same size as any of the original images of the group. The upsampling can restore image data that is needed for denoising of smaller details in the images.

Figure 3:
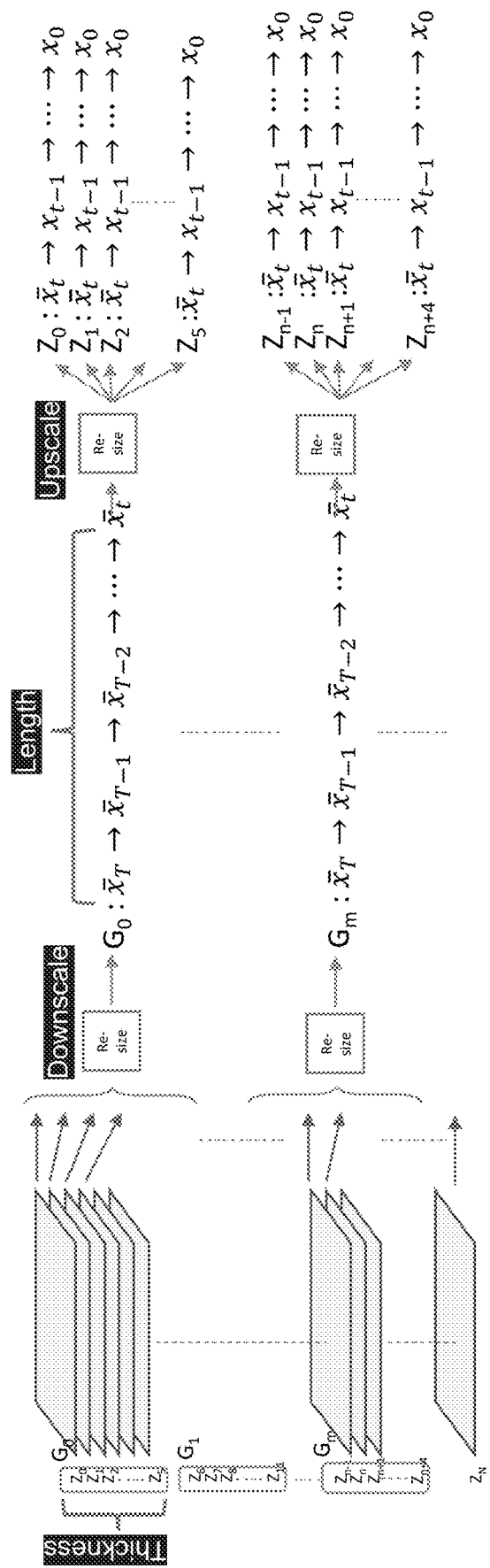
FIG. 3 is an illustration of tunable parameters of a bulk diffusion method according to one embodiment of the present disclosure.

FIG. 3 is an illustration of parameters that can be modulated in the bulk diffusion method. Each of the parameters can be set individually. The parameters can be shared between groups of images or can be different for one or more groups of images. In one embodiment, the thickness of a group is indicated as the number of images in a group. The representative image of a group can be downscaled prior to the T1 initial diffusion steps and then upscaled prior to the remaining T2 diffusion steps. The number of initial diffusion steps T1, or the length of the initial diffusion process, can also be adjusted. The length can be adjusted as a portion of the total number of diffusion steps T or can be an absolute number of steps.

FIG. 4 illustrates a process for implementing the bulk diffusion methods described herein, according to one embodiment of the present disclosure. The process of FIG. 4 can be implemented by a computer via computer-readable instructions. In one embodiment, a series of images can be grouped into one or more groups $G_0, G_1, \ldots G_M$. For each group, the DDPM can generate a series of restored representative images in initial diffusion steps (T1, or T to t) using Equation 1:

$$\bar{x}_{t-1} = \frac{1}{\sqrt{\alpha_t}}\left(\bar{x}_t - \frac{1-\alpha_t}{\sqrt{1-\bar{\alpha}_t}}\,\epsilon_\theta(\bar{x}_t, Y, t)\right) + \sigma_t k \quad \text{Equation 1}$$

wherein $\bar{x}_t$ is an input image (e.g., a pure noise image), $\bar{x}_{t-1}$ is a denoised image output, $\alpha_t, \bar{\alpha}_t, \alpha_t$ are scheduled (time step-dependent) parameters for noise, $\epsilon_\theta$ represents the trained model, Y is the conditional image, t is the time step, and k is a parameter following a normal distribution.

After T1 steps, the DDPM can generate a series of restored images in subsequent diffusion steps (t) for each image $Z_0, Z_1, \ldots Z_n$ in a group of images. The restored representative image $\bar{x}_t$, which is the last image in the series of restored representative images from the initial diffusion steps, can be used as the initial input image for the subsequent diffusion steps given the approximation $\bar{x}_t \approx x_t$ for each individual image after the initial diffusion steps. The subsequent diffusion steps are performed using the same model and Equation 1 for generating an output image in the initial diffusion steps. However, in the subsequent diffusion steps, the image from the group of images is used as the conditioning image instead of a representative image. After the t subsequent diffusion steps, the DDPM can output a final restored image $x_n$ for each input image $Z_0, Z_1, \ldots Z_n$ in the group. The process can be repeated for each group of images.

Figure 5C:
FIG. 5C is a restored medical image according to one embodiment of the present disclosure.
Figure 5B:
FIG. 5B is a restored medical image according to one embodiment of the present disclosure.
Figure 5A:
FIG. 5A is a medical image according to one embodiment of the present disclosure.

FIG. 5A through FIG. 5C illustrate the results of the bulk diffusion method described herein according to one embodiment of the present disclosure. FIG. 5A is an illustration of a target image, e.g., a medical image of the brain. In this example, the input images to a DDPM model are a series of 12 medical images. The DDPM can denoise each medical image of the series of 12 medical images. FIG. 5B is an illustration of a denoised medical image from the series of denoised medical images generated by the DDPM using the method described with reference to FIG. 1. The series of 12 medical images can be denoised by the DDPM using 200 diffusion steps for each image, resulting in 2400 total diffusion steps. FIG. 5C is an illustration of a denoised image from the series of denoised medical images generated by the DDPM using the bulk diffusion method described with reference to FIG. 2. The series of medical images can be denoised by the DDPM in the bulk diffusion method, wherein T1=190 and T2=10. Therefore, the series of 12 medical images can be denoised using 190+(10*12)=310 diffusion steps. The denoised images of FIG. 5B and FIG. 5C have the same quality and level of recovery.

The systems and methods described herein are compatible with other methods for reducing the processing time of a diffusion-based image denoising model. Such methods can include, but are not limited to, using a denoising diffusion implicit model; reducing the number of diffusion steps T; implementing an early stop to the diffusion process; using a fast ordinary differential equation solver; pre-segmentation diffusion sampling; and using a high-frequency space diffusion model.

Figure 6:
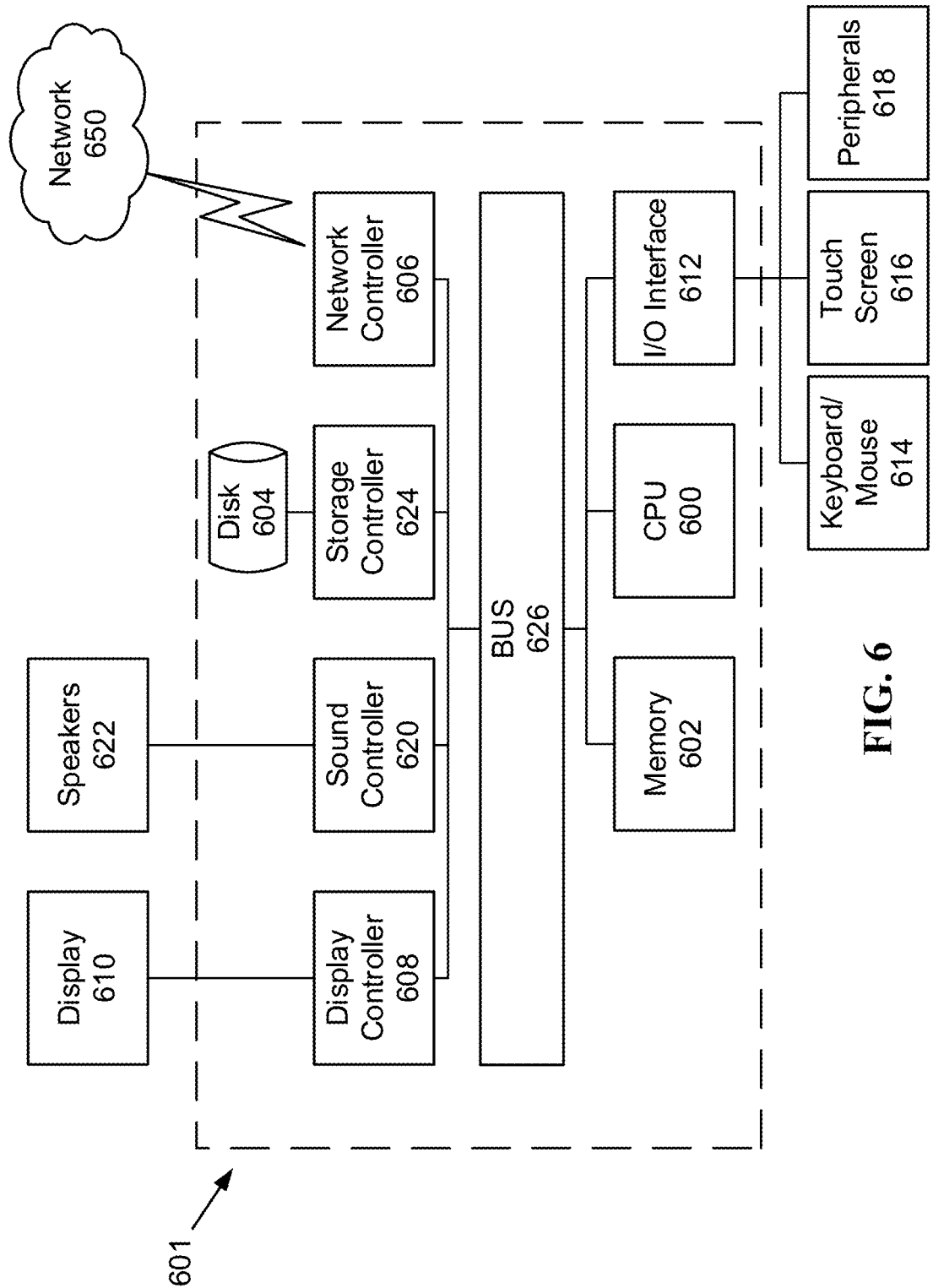
FIG. 6 is a schematic of a hardware system for performing a method according to one embodiment of the present disclosure.

Next, a hardware description of a device 601 according to exemplary embodiments is described with reference to FIG. 6. In FIG. 6 the device 601 includes processing circuitry. The device 601 can be used to execute any of the methods described herein related to obtaining the DDPM, training the DDPM, receiving acquired images, and/or denoising an image using the DDPM. In one embodiment, the device 601 can be a server, a computer, etc. In one embodiment, the device 601 can be in communication with or embedded in an image acquisition device, such as the CT device illustrated in FIG. 7. In one embodiment, the methods described herein can be distributed across one or more devices, the one or more devices including at least some of the elements of device 601. The processing circuitry includes one or more of the elements discussed next with reference to FIG. 6. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above.

The device 601 in FIG. 6 also includes a network controller 606, such as an Intel Ethernet PRO network interface card from Intel Corporation of America, for interfacing with network 650. and to communicate with the other devices. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA GeForce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Figure 7:
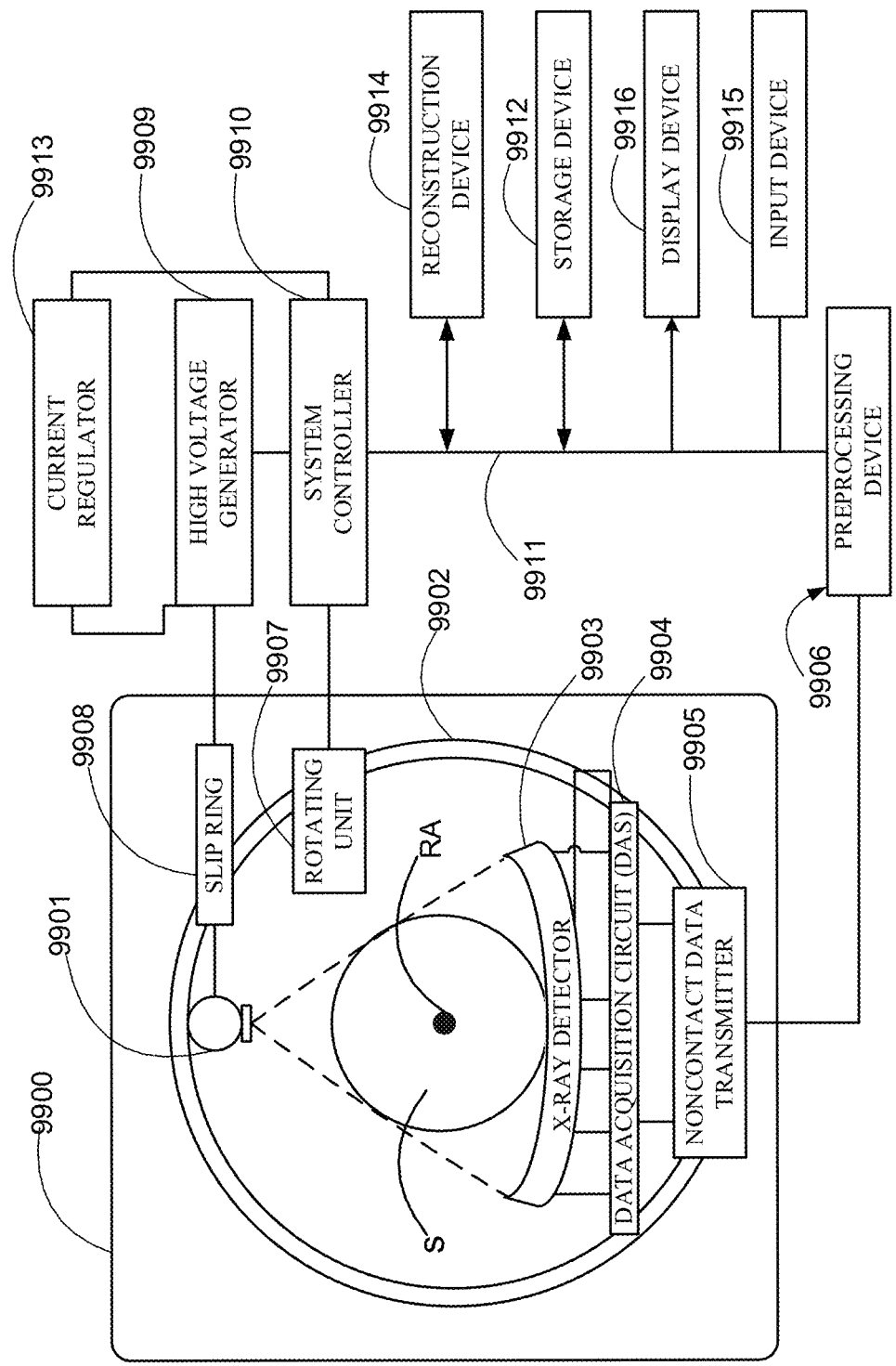
FIG. 7 is a schematic of an imaging system according to one embodiment of the present disclosure.

In one embodiment, the images processed using the bulk diffusion methods described herein can be CT images acquired by a CT apparatus or scanner. FIG. 7 illustrates an implementation of a radiography gantry included in a CT apparatus or scanner. As shown in FIG. 7, a radiography gantry 9900 is illustrated from a side view and further includes an X-ray tube 9901, an annular frame 9902, and a multi-row or two-dimensional-array-type X-ray detector 9903. The X-ray tube 9901 and X-ray detector 9903 are diametrically mounted across an object, such as, for example, a patient, on the annular frame 9902, which is rotatably supported around a rotation axis RA. A rotating unit 9907 rotates the annular frame 9902 at a high speed, such as, for example, 0.4 sec/rotation, while the object is being moved along the axis RA into or out of the illustrated page.

An embodiment of an X-ray computed tomography (CT) apparatus according to the present disclosure will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosure can be applied to either type. In this case, the rotate/rotate type, which is currently the mainstream, will be exemplified.

The multi-slice X-ray CT apparatus further includes a high voltage generator 9909 that generates a tube voltage applied to the X-ray tube 9901 through a slip ring 9908 such that the X-ray tube 9901 generates X-rays. An X-ray detector 9903 is located at an opposite side from the X-ray tube 9901 across the object for detecting the emitted X-rays that have transmitted through the object. The X-ray detector 9903 is for example a photon-counting detector. The X-ray detector, or the photon-counting detector 9903 further includes individual detector elements or units, such as, for example, processing circuitry.

The CT apparatus further includes other devices for processing the detected signals from X-ray detector 9903. A data acquisition circuit or a Data Acquisition System (DAS) 9904 converts a signal output from the X-ray detector 9903 for each channel into a voltage signal, amplifies the signal, and further converts the signal into a digital signal. The X-ray detector 9903 and the DAS 9904 are configured to manage a predetermined total number of projections per rotation (TPPR).

The above-described data is sent to a preprocessing device 9906, which is housed in a console outside the radiography gantry 9900 through a non-contact data transmitter 9905. The preprocessing device 9906 performs certain corrections. A memory 9912 stores the resultant data, which is also called projection data at a stage immediately before reconstruction processing. The memory 9912 is connected to a system controller 9910 through a data/control bus 9911, together with a reconstruction device 9914, input device 9915, and display 9916. The system controller 9910 controls a current regulator 9913 that limits the current to a level sufficient for driving the CT system.

The detectors are rotated and/or fixed with respect to the object being scanned, such as the patient, among various generations of the CT scanner systems. In one implementation, the above-described CT system can be an example of a combined third-generation geometry and fourth-generation geometry system. In the third-generation system, the X-ray tube 9901 and the X-ray detector 9903 are diametrically mounted on the annular frame 9902 and are rotated around the object as the annular frame 9902 is rotated about the rotation axis RA. In the fourth-generation geometry system, the detectors are fixedly placed around the patient and an X-ray tube 9901 rotates around the patient. In an alternative embodiment, the radiography gantry 9900 has multiple detectors arranged on the annular frame 9902, which is supported by a C-arm and a stand.

Post-reconstruction processing performed by the reconstruction device 9914 can include filtering and smoothing the image, volume rendering processing, and image difference processing as needed. The image reconstruction process can implement various CT image reconstruction methods. The reconstruction device 9914 can use the memory to store, e.g., projection data, reconstructed images, calibration data and parameters, and computer programs.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be as set forth in the following parentheticals.

(1) A method of denoising a plurality of input images, the method comprising: obtaining a diffusion-based probabilistic model that was trained, using at least one target image and at least one conditional image, to perform denoising over T steps, wherein T is an integer greater than or equal to two; grouping the plurality of input images into a plurality of groups; determining, for each group of the plurality of groups, an initial representative image for the group; performing, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

(2) The method of (1), wherein, for a particular group of the plurality of groups, the initial representative image is an average of each of the input images in the particular group.

(3) The method of (1) to (2), wherein, for a particular group of the plurality of groups, the initial representative image is one of the input images in the particular group.

(4) The method of (1) to (3), wherein the step of performing, for each group, the sequence of T1 denoising sampling steps comprises, for each sampling step in the sequence, supplying, as input to the model, the initial representative image for the group, a preceding one of the sequence of representative images for the group, and a value indicating the sampling step.

(5) The method of (1) to (4), wherein the grouping step further comprises grouping the plurality of input images into the plurality of groups such that not all of the groups are identical in size.

(6) The method of (1) to (5), further comprising obtaining the plurality of input images as a time sequence of reconstructed medical images.

(7) The method of (1) to (6), further comprising obtaining the plurality of input images as a spatial sequence of reconstructed medical images.

(8) The method of (1) to (7), wherein the step of determining the initial representative image for each group, of the plurality of groups, further comprises downsampling the input images in the group.

(9) The method of (1) to (8), further comprising, for each group of the plurality of groups, upsampling the last one of the sequence of representative images for the group.

(10) A non-transitory computer-readable storage medium for storing computer readable instructions that, when executed by a computer, cause the computer to perform a method, the method comprising: obtaining a diffusion-based probabilistic model that was trained, using at least one target image and at least one conditional image, to perform denoising over T steps, wherein T is an integer greater than or equal to two; grouping a plurality of input images into a plurality of groups; determining, for each group of the plurality of groups, an initial representative image for the group; performing, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

(11) The non-transitory computer-readable storage medium of (10), wherein, for a particular group of the plurality of groups, the initial representative image is an average of each of the input images in the particular group.

(12) The non-transitory computer-readable storage medium of (10) to (11), wherein, for a particular group of the plurality of groups, the initial representative image is one of the input images in the particular group.

(13) The non-transitory computer-readable storage medium of (10) to (12), wherein the step of performing, for each group, the sequence of T1 denoising sampling steps comprises, for each sampling step in the sequence, supplying, as input to the model, the initial representative image for the group, a preceding one of the sequence of representative images for the group, and a value indicating the sampling step.

(14) The non-transitory computer-readable storage medium of (10) to (13), wherein the grouping step further comprises grouping the plurality of input images into the plurality of groups such that not all of the groups are identical in size.

(15) The non-transitory computer-readable storage medium of (10) to (14), the method further comprising obtaining the plurality of input images as a time sequence of reconstructed medical images.

(16) The non-transitory computer-readable storage medium of (10) to (15), the method further comprising obtaining the plurality of input images as a spatial sequence of reconstructed medical images.

(17) The non-transitory computer-readable storage medium of (10) to (16), wherein the step of determining the initial representative image for each group, of the plurality of groups, further comprises downsampling the input images in the group.

(18) The non-transitory computer-readable storage medium of (10) to (17), the method further comprising, for each group of the plurality of groups, upsampling the last one of the sequence of representative images for the group.

(19) An apparatus, comprising: processing circuitry configured to obtain a diffusion-based probabilistic model that was trained, using at least one target image and at least one conditional image, to perform denoising over T steps, wherein T is an integer greater than or equal to two; group a plurality of input images into a plurality of groups; determine, for each group of the plurality of groups, an initial representative image for the group; perform, for each group using the obtained model, a sequence of T1 denoising sampling steps, starting with the initial representative image for the group, to generate a corresponding sequence of representative images for the group, wherein T1 is an integer greater than or equal to 1; and for each group of the plurality of groups, for each input image in the group: perform, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

(20) The apparatus of (19), wherein, for a particular group of the plurality of groups, the initial representative image is an average of each of the input images in the particular group or an input image of the particular group.

Obviously, numerous modifications and variations are possible in light of the above teachings. It is therefore to be understood that within the scope of the appended claims, embodiment of the present disclosure may be practiced otherwise than as specifically described herein.

The invention claimed is:

1. A method of denoising a plurality of input images, the method comprising:
obtaining a diffusion-based probabilistic model that was trained, using at least one target image and at least one conditional image, to perform denoising over T steps, wherein T is an integer greater than or equal to two;
grouping the plurality of input images into a plurality of groups;
determining, for each group of the plurality of groups, an initial representative image for the group;
performing, for each group using the obtained model, a sequence of T1 denoising sampling steps, starting with the initial representative image for the group, to generate a corresponding sequence of representative images for the group, wherein T1 is an integer greater than or equal to 1; and
for each group of the plurality of groups,
for each input image in the group:
performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

2. The method of claim 1, wherein, for a particular group of the plurality of groups, the initial representative image is an average of each of the input images in the particular group.

3. The method of claim 1, wherein, for a particular group of the plurality of groups, the initial representative image is one of the input images in the particular group.

4. The method of claim 1, wherein the step of performing, for each group, the sequence of T1 denoising sampling steps comprises, for each sampling step in the sequence, supplying, as input to the model, the initial representative image for the group, a preceding one of the sequence of representative images for the group, and a value indicating the sampling step.

5. The method of claim 1, wherein the grouping step further comprises grouping the plurality of input images into the plurality of groups such that not all of the groups are identical in size.

6. The method of claim 1, further comprising obtaining the plurality of input images as a time sequence of reconstructed medical images.

7. The method of claim 1, further comprising obtaining the plurality of input images as a spatial sequence of reconstructed medical images.

8. The method of claim 1, wherein the step of determining the initial representative image for each group, of the plurality of groups, further comprises downsampling the input images in the group.

9. The method of claim 8, further comprising, for each group of the plurality of groups, upsampling the last one of the sequence of representative images for the group.

10. A non-transitory computer-readable storage medium for storing computer readable instructions that, when executed by a computer, cause the computer to perform a method, the method comprising:
obtaining a diffusion-based probabilistic model that was trained, using at least one target image and at least one conditional image, to perform denoising over T steps, wherein T is an integer greater than or equal to two;
grouping a plurality of input images into a plurality of groups;
determining, for each group of the plurality of groups, an initial representative image for the group;
performing, for each group using the obtained model, a sequence of T1 denoising sampling steps, starting with the initial representative image for the group, to generate a corresponding sequence of representative images for the group, wherein T1 is an integer greater than or equal to 1; and
for each group of the plurality of groups,
for each input image in the group:
performing, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

11. The non-transitory computer-readable storage medium of claim 10, wherein, for a particular group of the plurality of groups, the initial representative image is an average of each of the input images in the particular group.

12. The non-transitory computer-readable storage medium of claim 10, wherein, for a particular group of the plurality of groups, the initial representative image is one of the input images in the particular group.

13. The non-transitory computer-readable storage medium of claim 10, wherein the step of performing, for each group, the sequence of T1 denoising sampling steps comprises, for each sampling step in the sequence, supplying, as input to the model, the initial representative image for the group, a preceding one of the sequence of representative images for the group, and a value indicating the sampling step.

14. The non-transitory computer-readable storage medium of claim 10, wherein the grouping step further comprises grouping the plurality of input images into the plurality of groups such that not all of the groups are identical in size.

15. The non-transitory computer-readable storage medium of claim 10, the method further comprising obtaining the plurality of input images as a time sequence of reconstructed medical images.

16. The non-transitory computer-readable storage medium of claim 10, the method further comprising obtaining the plurality of input images as a spatial sequence of reconstructed medical images.

17. The non-transitory computer-readable storage medium of claim 10, wherein the step of determining the initial representative image for each group, of the plurality of groups, further comprises downsampling the input images in the group.

18. The non-transitory computer-readable storage medium of claim 17, the method further comprising, for each group of the plurality of groups, upsampling the last one of the sequence of representative images for the group.

19. An apparatus, comprising:
processing circuitry configured to
obtain a diffusion-based probabilistic model that was trained, using at least one target image and at least one conditional image, to perform denoising over T steps, wherein T is an integer greater than or equal to two;
group a plurality of input images into a plurality of groups;
determine, for each group of the plurality of groups, an initial representative image for the group;
perform, for each group using the obtained model, a sequence of T1 denoising sampling steps, starting with the initial representative image for the group, to generate a corresponding sequence of representative images for the group, wherein T1 is an integer greater than or equal to 1; and
for each group of the plurality of groups,
for each input image in the group:
perform, using the obtained model, a second sequence of T2 denoising sampling steps, starting with a last one of the sequence of representative images for the group, to generate a final image that is a restored image corresponding to the input image, wherein T2 is an integer greater than or equal to 1, and T=T1+T2.

20. The apparatus of claim 19, wherein, for a particular group of the plurality of groups, the initial representative image is an average of each of the input images in the particular group or an input image of the particular group.

* * * * *